Patented June 24, 1952

2,601,461

UNITED STATES PATENT OFFICE 2,601,461

N-[2-METHOXY-3-($\alpha,\beta$-DICARBOXYETHYL-MERCAPTOMERCURI)-PROPYL]-o-CARBOXYMETHYLSALICYLAMIDE Robert S. Shelton, Mariemont, Josselyn L. Farmer, Cincinnati, and Charles H. Tilford, Silverton, Ohio, assignors to The Wm. S. Merrell Company, Cincinnati, Ohio, a corporation of Delaware No Drawing. Application May 20, 1949, Serial No. 94,526

1 Claim. (Cl. 260—434)

This invention relates to a new chemical compound N-[2-methoxy-3-($\alpha,\beta$-dicarboxyethylmercaptomercuri)-propyl]-o-carboxymethylsalicylamide of the formula

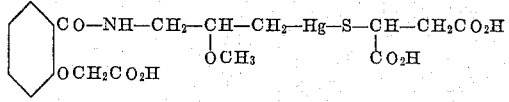

useful as a diuretic. The new compound which will ordinarily be produced and used in the form of its trisodium salt is characterized by relative freedom from toxicity, by capacity of administration intravenously, intramuscularly and subcutaneously and by stability in aqueous solution. It is markedly soluble in water, solutions of concentrations up to 50% being readily produced and its solutions are quite stable both at room and icebox temperature. Administration of the compound for diuresis is based on its mercury content, and is in accordance with common practice with the presently used mercurial diuretics such as Mersalyl and Merbaphen.

The new compound is readily prepared by reaction of thiomalic acid, sodium hydroxide and N-(2-methoxy-3-hydroxymercuripropyl)-o-carboxymethylsalicylamide and its preparation is illustrated by the following example.

Example

A solution of 7.5 parts of thiomalic acid, 6 parts of sodium hydroxide, and 180 parts of 55% methanol was added to a stirred suspension of 24 parts of N-(2-methoxy-3-hydroxymercuripropyl)-o-carboxymethylsalicylamide in 80 parts of methanol over a period of 30 minutes at 20°. The mixture was allowed to stand at room temperature for six hours, filtered from a small amount of insoluble material, and diluted with 160 parts of ethanol. The solution was cooled to 0° C., and 160 parts of 2-propanol was added with stirring. The white solid sodium salt was collected at the filter and dried at 0.1 mm. over calcium chloride. The yield of product melting at about 210-5° was approximately 30 parts.

We claim:

N-[2-methoxy-3-($\alpha,\beta$-dicarboxyethylmercaptomercuri)-propyl]-o-carboxymethylsalicylamide.

ROBERT S. SHELTON.
JOSSELYN L. FARMER.
CHARLES H. TILFORD.

REFERENCES CITED

The following references are of record in the file of this patent:

UNITED STATES PATENTS

| Number | Name | Date |
|---|---|---|
| 1,589,599 | Kharasch | June 22, 1926 |
| 1,672,615 | Kharasch | June 5, 1928 |

FOREIGN PATENTS

| Number | Country | Date |
|---|---|---|
| 219,010 | Switzerland | Jan. 15, 1942 |
| 619,515 | Great Britain | Mar. 10, 1949 |